United States Patent
Fan et al.

(10) Patent No.: US 10,366,304 B2
(45) Date of Patent: Jul. 30, 2019

(54) LOCALIZATION AND MAPPING METHOD

(71) Applicant: Nokia Technologies Oy, Espoo (FI)

(72) Inventors: Lixin Fan, Tampere (FI); Youji Feng, Beijing (CN); Yihong Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 13 days.

(21) Appl. No.: 15/543,891

(22) PCT Filed: Jan. 27, 2015

(86) PCT No.: PCT/CN2015/071607
§ 371 (c)(1),
(2) Date: Jul. 14, 2017

(87) PCT Pub. No.: WO2016/119117
PCT Pub. Date: Aug. 4, 2016

(65) Prior Publication Data
US 2018/0012105 A1 Jan. 11, 2018

(51) Int. Cl.
*G06K 9/46* (2006.01)
*G06K 9/00* (2006.01)
(Continued)

(52) U.S. Cl.
CPC ......... *G06K 9/4671* (2013.01); *G06F 16/583* (2019.01); *G06K 9/00214* (2013.01);
(Continued)

(58) Field of Classification Search
USPC ...................................................... 382/154
See application file for complete search history.

(56) References Cited

U.S. PATENT DOCUMENTS

| 2013/0266195 A1 | 10/2013 | Shell et al. |
| 2013/0301931 A1 | 11/2013 | Piscout |
| (Continued) | | |

FOREIGN PATENT DOCUMENTS

| CN | 103238159 A |   | 8/2013 |   |
| CN | 106908064 | * | 6/2017 | ............. G01C 21/20 |
| (Continued) | | | | |

OTHER PUBLICATIONS

Feng et al., "Online Learning of Binary Feature Indexing for Real-Time SLAM Relocalization", Asian Conference on Computer Vision, 2014, pp. 01-12.

(Continued)

*Primary Examiner* — Jerome Grant, II
(74) *Attorney, Agent, or Firm* — Alston & Bird LLP

(57) ABSTRACT

A method comprising: obtaining a three-dimensional (3D) point cloud about an object; obtaining binary feature descriptors for feature points in a 2D image about the object; assigning a plurality of index values for each feature point as multiple bits of the corresponding binary feature descriptor; storing the binary feature descriptor in a table entry of a plurality of hash key tables of a database image; obtaining query binary feature descriptors for feature points in a query image; matching the query binary feature descriptors to the binary feature descriptors of the database image; reselecting one bit of the hash key of the matched database image; and re-indexing the feature points in the table entries of the hash key table of the database image.

20 Claims, 5 Drawing Sheets

(51) Int. Cl.
G06T 7/33 (2017.01)
G06T 7/246 (2017.01)
G06K 9/62 (2006.01)
G06F 16/583 (2019.01)

(52) U.S. Cl.
CPC ....... *G06K 9/00664* (2013.01); *G06K 9/6293* (2013.01); *G06T 7/246* (2017.01); *G06T 7/33* (2017.01); *G06T 2207/30244* (2013.01)

(56) References Cited

U.S. PATENT DOCUMENTS

| 2014/0010407 | A1 | 1/2014 | Sinha et al. |
| 2014/0025607 | A1 | 1/2014 | Wang et al. |
| 2018/0005015 | A1* | 1/2018 | Hou ................ G01S 17/023 |

FOREIGN PATENT DOCUMENTS

| JP | 2008092471 A | 4/2008 |
| JP | 2009020769 A | 1/2009 |
| JP | 2011221689 A | 11/2011 |
| WO | 2014/050952 A1 | 4/2014 |
| WO | 2014153724 A1 | 10/2014 |

OTHER PUBLICATIONS

Davison et al., "MonoSLAM: Real-Time Single Camera SLAM", IEEE Transactions on Pattern Analysis and Machine Intelligence, vol. 29, No. 6, Jun. 2007, pp. 1052-1067.

Klein et al., "Parallel Tracking and Mapping for Small AR Workspaces", 6th IEEE and Acm International Symposium on Mixed and Augmented Reality, Nov. 13-16, 2007, 10 pages.

Sattler et al., "Fast Image-Based Localization Using Direct 2D-to-3D Matching", International Conference on Computer Vision, Nov. 6-13, 2011, 8 pages.

Lim et al., "Real-Time Image-Based 6-DOF Localization in Large-Scale Environments", IEEE Conference on Computer Vision and Pattern Recognition, 2012, pp. 1043-1050.

Li et al., "Worldwide Pose Estimation Using 3D Point Clouds", Proceedings of the 12th European conference on Computer Vision, Oct. 7-13, 2012, pp. 01-14.

Lowe, "Distinctive Image Features from Scale-Invariant Keypoints", International Journal of Computer Vision, vol. 60, No. 2, 2004, pp. 1-28.

Tola et al., "DAISY: An Efficient Dense Descriptor Appliedto Wide-Baseline Stereo", IEEE Transactions on Pattern Analysis and Machine Intelligence, vol. 32, No. 5, May 2010, pp. 815-830.

Williams et al., "Automatic Relocalization and Loop Closing for Real-Time Monocular SLAM", IEEE Transactions on Pattern Analysis and Machine Intelligence, vol. 33, No. 9, Sep. 2011, pp. 1699-1712.

Ozuysal et al., "Fast Keypoint Recognition Using Random Ferns", IEEE Transactions on Pattern Analysis and Machine Intelligence, vol. 32, No. 3, Mar. 2010, pp. 1-14.

Straub et al., "Fast Relocalization for Visual Odometry Using Binary Features", IEEE International Conference on Image Processing, Sep. 15-18, 2013, 5 pages.

Calonder et al., "BRIEF: Binary Robust Independent Elementary Features", European Conference on Computer Vision, vol. 6314, 2010, pp. 778-792.

Rublee et al., "ORB: An Efficient Alternative to SIFT or SURF", Proceedings of the International Conference on Computer Vision, Nov. 6-13, 2011, pp. 2564-2571.

Leutenegger et al., "BRISK: Binary Robust Invariant Scalable Keypoints", International Conference on Computer Vision, Nov. 6-13, 2011, 8 pages.

Gionis et al., "Similarity Search in High Dimensions via Hashing", Proceedings of the 25th International Conference on Very Large Data Bases, Sep. 7-10, 1999, pp. 518-529.

Rosten et al., "Machine Learning for High-Speed Corner Detection", European Conference on Computer Vision, 2006, 14 pages.

Fischler et al., "Random Sample Consensus: a Paradigm for Model Fitting with Applications to Image Analysis and Automated Cartography", Magazine Communications of the ACM, vol. 24, No. 6, Jun. 1981, pp. 381-395.

Lepetit et al., "EPnP: An Accurate O(n) Solution to the PnP Problem", International Journal of Computer Vision, vol. 31, No. 2, Feb. 2009, 12 pages.

Extended European Search Report received for corresponding European Patent Application No. 15879328.1, dated Jul. 11, 2018, 8 pages.

Office action received for corresponding Japanese Patent Application No. 2017-539241, dated Jul. 24, 2018, 2 pages of office action and 2 pages of office action translation available.

Ambai et al., "CARD: Compact and Real-time Descriptors", International Conference on Computer Vision, 2011, pp. 1682-1689.

Shirakawa, "Fast Similarity Search Using Multiple Binary Codes", 22nd International Conference on Pattern Recognition, 2014, pp. 19-24.

Ogawa et al., "Robust Object Recognition Against Viewpoint Change by Using Generative Learning and LSH", IEICE Technical Report, vol. 110, No. 467, Mar. 10-11, 2011, pp. 79-84.

International Search Report and Written Opinion received for corresponding Patent Cooperation Treaty Application No. PCT/CN2015/071607, dated Jul. 30, 2015, 12 pages.

* cited by examiner

| Video segments | V1 | | V2 | |
|---|---|---|---|---|
| # query frames | 8,000 | | 1,063 | |
| # 3D points | 37,641 | | 4,173 | |
| # database features | 175,207 | | 20,846 | |
| Indexing method | Original LSH | Learned LSH | Original LSH | Learned LSH |
| # relocalized frames | 7,832 | 7,859 | 927.8 | 953.2 |
| Timings (ms) | | | | |
| Corner detection | 8.3 | 8.5 | 7.8 | 7.8 |
| Descriptor extraction | 8.3 | 8.3 | 10.03 | 10.03 |
| ANN search | 30.4 | 17.5 | 3.7 | 3.5 |
| RANSAC | 0.5 | 0.5 | 1.2 | 1.2 |
| Total | 48.3 | 35.9 | 24.8 | 24.6 |

Fig. 7

LOCALIZATION AND MAPPING METHOD

RELATED APPLICATION

This application was originally filed as Patent Cooperation Treaty Application No. PCT/CN2015/071607 filed Jan. 27, 2015.

FIELD OF THE INVENTION

The present invention relates to image processing, and more particularly to simultaneous localization and mapping of point clouds.

BACKGROUND OF THE INVENTION 3D point clouds are used in various image processing and computer vision applications. 3D point clouds are sets of data points in a 3D coordinate system typically representing an external surface of an object. A large number of points are measured on the surface of an object, and the obtained point cloud may be stored in a file. For computer vision applications, the 3D points are typically mapped to a recognized feature of a 2D image of the object.

Simultaneous localization and mapping (SLAM) has been extensively studied in both robotics and computer vision. SLAM refers to a problem of updating a map of an unknown environment while simultaneously localizing an observer within it. One important feature in SLAM is the relocalization, i.e. the recovery of the camera pose after a tracking failure. Since the camera pose can be estimated using correspondences between 3D points in the map and 2D features in the image, the key problem in the relocalization is to obtain the 3D-2D correspondences. The relocalization process may be considered as reversed to the mapping process: features are extracted from the 2D image and matched against those of the 3D points.

A 3D point cloud of an object or a scene may have enormous volume; it may contain millions of points. For fostering the collection of 3D-2D correspondences e.g. in SLAM, methods for obtaining binary features instead of 2D image features, thus reducing the amount of data to be processed, have been developed. A method for further speeding up feature matching is called Locality Sensitive Hashing (LSH), which is used to perform approximate nearest neighbor (ANN) search.

However, in SLAM relocalization real time performance is of critical importance, and due to the vast amount of data to be processed, the prior art methods do not provide satisfying efficiency.

SUMMARY OF THE INVENTION

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, a method according to the invention is based on the idea of obtaining a three-dimensional (3D) point cloud about an object; obtaining binary feature descriptors for feature points in a 2D image about the object; assigning a plurality of index values for each feature point as multiple bits of the corresponding binary feature descriptor; storing the binary feature descriptor in a table entry of a plurality of hash key tables of a database image; obtaining query binary feature descriptors for feature points in a query image; matching the query binary feature descriptors to the binary feature descriptors of the database image; reselecting one bit of the hash key of the matched database image; and re-indexing the feature points in the table entries of the hash key table of the database image.

According to an embodiment, the method further comprises reselecting said one bit of the hash key of the matched database image such that a cost function defining uniformity of sizes of the table entries and a collision rate of matched feature pairs is minimized.

According to an embodiment, said cost function is $C=\lambda(1-p_c)+1/(1-u')$, where $\lambda$ is a preset weight, $p_c$ is a probability that two matched features coincide at a certain bit and $u'$ is a factor of time reduction in a linear search for matching the query binary feature descriptors to the binary feature descriptors.

According to an embodiment, said multiple bits of the index values for each feature point are selected randomly from the corresponding binary feature descriptor.

According to an embodiment, the query binary feature descriptors are matched to the binary feature descriptors of the database image using an approximated nearest neighbor (ANN) search.

According to an embodiment, reselecting said one bit for the hash key in a randomly composed subset of the feature points.

According to an embodiment, the method further comprises reselecting said one bit among a first half of the hash keys when a new query image is obtained; and reselecting said one bit among a second half of the hash keys when a next query image is obtained.

According to a second aspect, there is provided an apparatus comprising at least one processor, memory including computer program code, the memory and the computer program code configured to, with the at least one processor, cause the apparatus to at least: obtain a three-dimensional (3D) point cloud about an object; obtain binary feature descriptors for feature points in a 2D image about the object; assign a plurality of index values for each feature point as multiple bits of the corresponding binary feature descriptor; store the binary feature descriptor in a table entry of a plurality of hash key tables of a database image; obtain query binary feature descriptors for feature points in a query image; match the query binary feature descriptors to the binary feature descriptors of the database image; reselect one bit of the hash key of the matched database image; and re-index the feature points in the table entries of the hash key table of the database image.

According to a third aspect, there is provided a computer readable storage medium stored with code thereon for use by an apparatus, which when executed by a processor, causes the apparatus to perform: obtaining a three-dimensional (3D) point cloud about an object; obtaining binary feature descriptors for feature points in a 2D image about the object; assigning a plurality of index values for each feature point as multiple bits of the corresponding binary feature descriptor; storing the binary feature descriptor in a table entry of a plurality of hash key tables of a database image; obtaining query binary feature descriptors for feature points in a query image; matching the query binary feature descriptors to the binary feature descriptors of the database image; reselecting one bit of the hash key of the matched database image; and re-indexing the feature points in the table entries of the hash key table of the database image.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a computer graphics system suitable to be used in a 3D point cloud analysis process according to an embodiment;

FIG. 7 shows a table of relocalization accuracy in an experiment carried out according to an embodiment of the invention.

DESCRIPTION OF EMBODIMENTS

Figure 1:
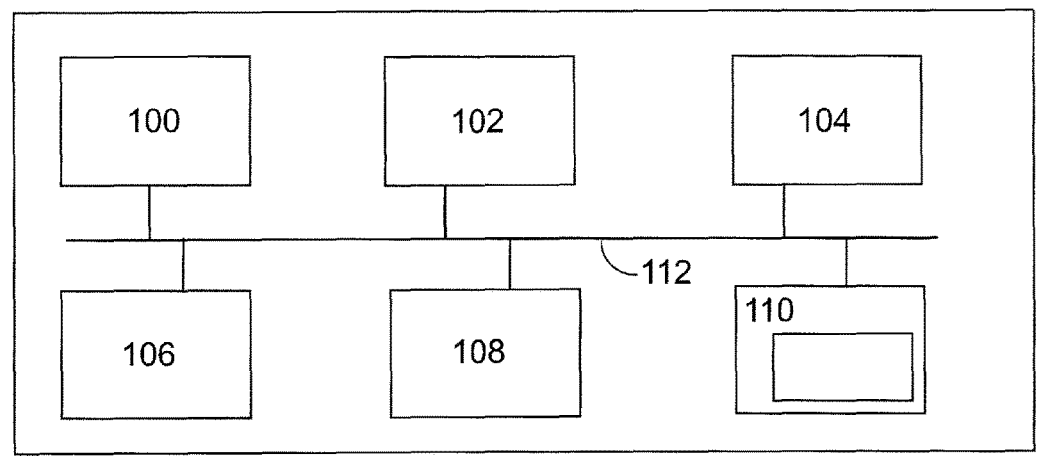

FIG. 1 shows a computer graphics system suitable to be used in image processing, for example in 3D point cloud analysis process according to an embodiment. The generalized structure of the computer graphics system will be explained in accordance with the functional blocks of the system. For a skilled man, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 is a conventional processing unit arranged to process data within the data processing system. The memory 102, the storage device 104, the input device 106, and the output device 108 are conventional components as recognized by those skilled in the art. The memory 102 and storage device 104 store data within the data processing system 100. Computer program code resides in the memory 102 for implementing, for example, a 3D point cloud analysis process. The input device 106 inputs data into the system while the output device 108 receives data from the data processing system and forwards the data, for example to a display. The data bus 112 is a conventional data bus and while shown as a single line it may be a combination of a processor bus, a PCI bus, a graphical bus, and an ISA bus. Accordingly, a skilled man readily recognizes that the apparatus may be any conventional data processing device, such as a computer device, a personal computer, a server computer, a mobile phone, a smart phone or an Internet access device, for example Internet tablet computer. The input data of the 3D point cloud analysis process according to an embodiment and means for obtaining the input data are described further below.

It needs to be understood that different embodiments allow different parts to be carried out in different elements. For example, various processes of the 3D point cloud analysis may be carried out in one or more processing devices; for example, entirely in one computer device, or in one server device or across multiple user devices The elements of the 3D point cloud analysis process may be implemented as a software component residing on one device or distributed across several devices, as mentioned above, for example so that the devices form a so-called cloud.

3D point clouds are used in various image processing and computer vision applications. 3D point clouds are sets of data points in a 3D coordinate system typically representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. In Structure-From-Motion (SFM), three-dimensional structures are estimated from two-dimensional image sequences, where the observer and/or the objects to be observed move in relation to each other. The obtained geometric models are stored as 3D point clouds.

In Light Detection And Ranging (LiDAR) method, distances are measured by illuminating an object with a laser beam (e.g. ultraviolet, visible, or near-infrared light) and analyzing the reflected light. The resulting data is stored as point clouds. The LiDAR point clouds may be regarded as a set of vertices in a three-dimensional coordinate system, wherein a vertex may be represented by a planar patch defined by a 3D vector.

For computer vision applications, the 3D points are typically mapped to a recognized feature of a 2D image of the object. Simultaneous localization and mapping (SLAM) of 3D point clouds has been extensively studied in both robotics and computer vision. SLAM refers to a problem of updating a map of an unknown environment while simultaneously localizing an observer within it. A SLAM system may be implemented in various ways, but basically it may be considered to comprise a background mapping process and a foreground tracking process.

The mapping process collects keyframes from the video sequence and performs e.g. a Structure-From-Motion (SFM) process to build a map of the environment. The process may be carried out incrementally. When a new keyframe is inserted, corner points of features may be searched first. Herein, for example the FAST (Features from Accelerated Segment Test) method can be used for extracting the corner points. Some of the corners may be identified as the observations of the old 3D points, while the remaining are matched against the corners in the nearest keyframes to triangulate new 3D points.

Figure 2:
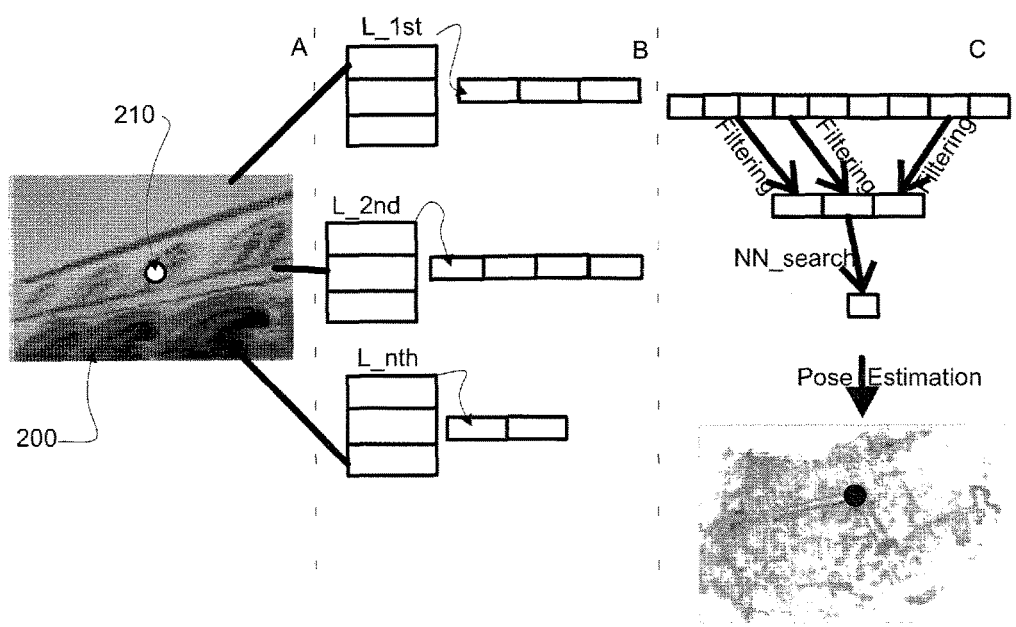
FIG. 2 shows an example of a binary feature based matching method.

In the mapping process, binary features may be obtained for reducing the amount of data to be processed. FIG. 2 illustrates an example of a binary feature based matching method, wherein a query image 200 having a feature point 210 is shown. From the query image 200, binary feature descriptors are obtained. Binary feature descriptor is a bit string that is obtained by a binary test on the patch around the feature point 210. Term "patch" is used to refer an area around a pixel. The pixel may be a central pixel of the area defined by its x and y coordinates and the patch typically includes a plurality of, possibly all, neighboring pixels. An appropriate size of the patch may also be defined for each feature point.

From a video sequence, a number of keyframes may be selected as database images. For database images, 3D points can be reconstructed from feature point tracks in the database images, e.g. by using SFM approaches. At first, binary feature descriptors are extracted for the database feature points that are associated with the reconstructed 3D points. "Database feature points" are a subset of all features points that are extracted from database images. Those feature points that cannot be associated with any 3D points are not included as database feature points. Because each 3D point can be viewed from multiple images (viewpoints), there are often multiple image feature points (i.e. image patches) associated with the same 3D point.

The database feature points are preferably indexed to facilitate a later search of the feature points. For example, multiple randomized trees may be trained to index substantially all database feature points. After the training process, the database features points and their indices may be stored in the leaf nodes.

An image used for camera pose estimation (referred to as "query image") is processed accordingly. For the query image, reduced binary feature descriptors for the feature points (FIG. 2; 210) in the query image 200 are extracted. "Query feature points" are a subset of all features points that are extracted from query image. The feature points of the query image are put to the leaves $L\_1^{st}$-$L\_n^{th}$ of the 1-n trees (FIG. 2). The query feature points may be indexed by their binary form on the leaves of the tree.

The query feature points are matched against the database feature points in order to have a series of 2D-3D correspondences. FIG. 2 illustrates an example of the process of matching a single query feature point 210 with the database feature points. The camera pose of the query image is estimated through the resulted 2D-3D correspondences.

The tracking process estimates the camera pose of each frame by tracking the 3D points in the map. Under the assumption of continuous camera motion, the observations of the 3D points can be searched around their predicted locations. Once the observations are found, i.e. the 3D-2D correspondences are established, the camera pose may be trivially estimated e.g. by using a non-linear optimization routine. During the tracking process, tracking failure may happen e.g. due to sudden changes of the illumination, full occlusions, or extreme motion blur. In such an occasion, a relocalization process may be carried out to re-estimate the camera pose and restart the tracking process.

The aim of the relocalization is to estimate the camera pose of an image after the tracking failure. Being the same as in the tracking process, the core problem in the relocalization is also to find the observations of the 3D points, except that the observations can no longer be predicted from the camera poses of previous frames. Once the observations are found, the camera pose can be estimated e.g. by RANSAC (RANdom SAmple Consensus) and/or Perspective-n-Points algorithms.

Obtaining the observations of the 3D points is treated as the problem of feature matching. For example, whenever the observation of a 3D point is found in a keyframe, a binary descriptor at this observation may be extracted. Consequently, each 3D point corresponds to a set of binary descriptors which are referred to as database features. In an image being relocalized, FAST corners along with their binary descriptors, referred to as query features, may be first extracted. Then, the top two nearest neighbors of each query may be searched among the database features, and if being sufficiently similar, the nearest neighbor is deemed as the match.

A method for further speeding up feature matching is called Locality Sensitive Hashing (LSH), which is used to perform approximate nearest neighbor (ANN) search. LSH uses hash keys to index a feature. It assigns an index value to the feature under each key. When performing ANN search, database features are stored in multiple hash tables. Each hash table corresponds to a hash key. The designated table entry, i.e. hash bucket, in which a database feature should be stored is determined by the index value. Given a query feature, the index values are first assigned and the corresponding buckets are found in the same way as database features. Then a linear search is performed among the database features in these buckets to retrieve the approximate nearest neighbors. For binary features, the hash key is simply a set of bits randomly selected from the descriptor bits. Consequently, a binary code can be assigned to a feature by concatenating the values at these bits, and the index value of the feature is the integer converted by the binary code.

Figure 3:
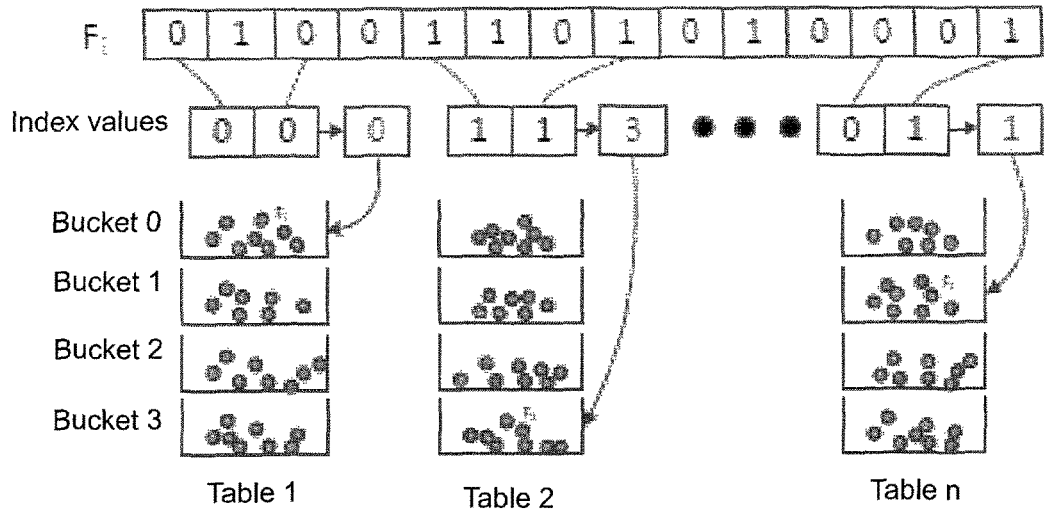
FIG. 3 shows an example for indexing a database feature $F_i$ and storing binary feature descriptors in hash tables.

FIG. 3 shows a simple example on how a database feature $F_i$ is indexed and stored in the hash tables. The database feature $F_i$ comprises a string of descriptor bits, from which a plurality of randomly selected pairs of bits are selected as index values. For example, a first bit pair 00 is randomly selected as the index for the hash table 1. The hash table comprises four table entries, i.e. hash buckets 0, 1, 2, and 3. The value of the index determines into which table entry the database feature is stored. The bit pair 00 of as the index for the hash table 1 represents a value 0, thus the database feature is stored in bucket 0 in the first hash table. A second bit pair 11, representing a value 3, is randomly selected as the index for the hash table 2. As a result, the database feature is stored in bucket 3 of the second hash table. Similarly, a $n^{th}$ bit pair 01, representing a value 1, is randomly selected as the index for the hash table n, and therefore the database feature is stored in bucket 1 of the $n^{th}$ hash table.

It is to be noted that even though the above example uses a bit pair (i.e. two bits) as the hash keys, any number of multiple bits, such as 3, 4, 5, etc., can be used as the length of hash keys.

However, even though the above arrangement provides a rather fast and reliable relocation procedure, the arrangement involves features which inherently introduce some inefficiency in the relocation procedure, thus hindering it to be carried out in real time. For example, the ever-changing set of database features in the indexing process introduces some latency to the system.

Herein below, a novel approach for constructing hash keys is presented, which utilizes an online learning process instead of pure randomness.

Figure 4:
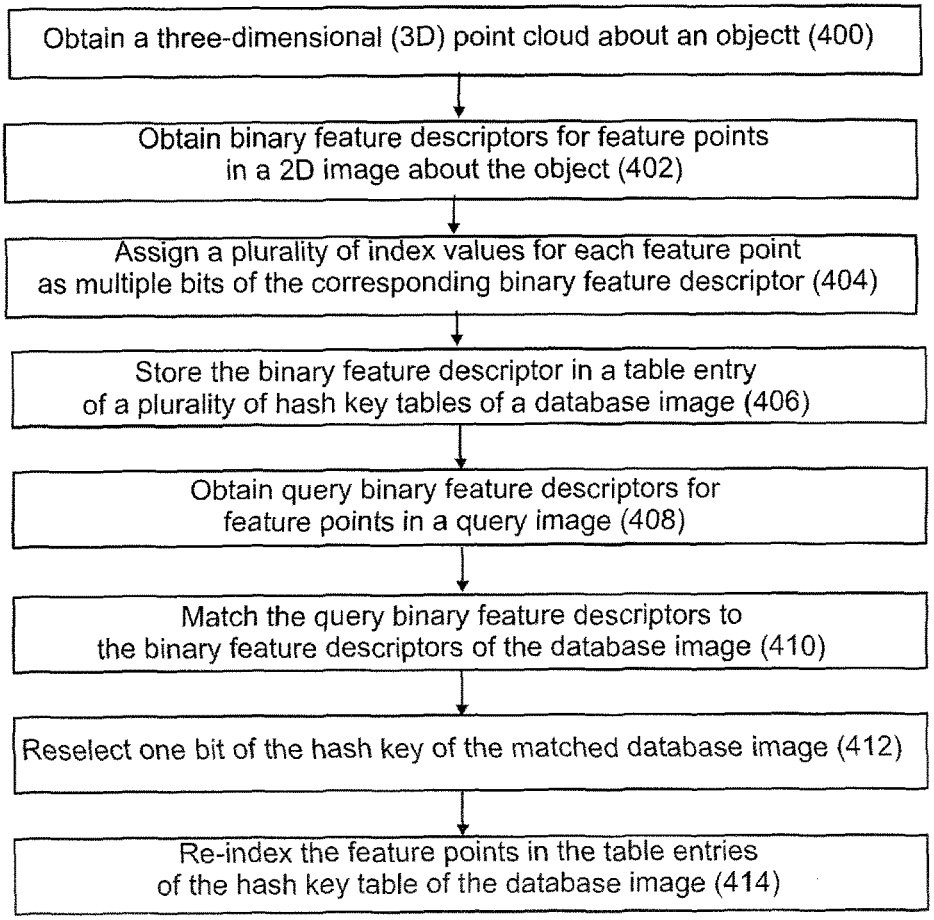
FIG. 4 shows a flow chart for a hash key construction process according to an embodiment of the invention.

The method according to the embodiment is illustrated in FIG. 4. In the method, a three-dimensional (3D) point cloud about an object is obtained (400) and binary feature descriptors for feature points in a 2D image about the same object are obtained (402) as well. A plurality of index values for each feature point is assigned (404) as multiple bits of the corresponding binary feature descriptor, and each index value for each feature point is stored (406) in a table entry of a hash key table of a database image. Then, for a query image, query binary feature descriptors for feature points in a query image are obtained (408). The query binary feature descriptors are matched (410) to the binary feature descriptors of the database image, whereafter one bit of the hash key of the matched database image is reselected (412) and the feature points are re-indexed (414) in the table entries of the hash key table of the database image.

In other words, to alleviate the latency in the system and handle the ever-changing set of database features, the bit selection is distributed into the SLAM process. Initially, the bits composing each hash key are selected randomly, as in LSH. Whenever a new keyframe is inserted and the set of the database features is updated, one bit of each hash key is re-selected to minimize the cost function. Then the database features are re-indexed using the new hash keys.

The consideration underlying the embodiments stems from the fact that there are two factors closely related to the efficiency of the indexing scheme for ANN search: the distribution of the bucket sizes and the collision rate of matched feature pairs. The size of a bucket indicates the number of the database features stored in the bucket. It has been shown in "Orb: An efficient alternative to sift or surf" by Rublee, E., Rabaud, V., Konolige, K., Bradski, G, in Proc. IEEE Int. Conf. Computer Vision (2011). pp. 2564-2571, that usually the more uniform the bucket sizes are the faster ANN search will be. The collision rate of matched feature pairs is the probability of two matched features colliding in the same bucket. Higher collision rate leads to higher search accuracy. With both factors being considered, the indexing method according to embodiments aims to attain uniform buckets and high collision rates, so that ANN search can be performed fast and accurately.

According to an embodiment, the bits composing the hash keys are selected to minimize a corresponding cost function.

The Uniformity of the Bucket Sizes

Let the normalized bucket sizes of a hash table be $\{s_n, n=1, 2, \ldots, N\}$ subject to $\Sigma s_n=1$, where N is the total number of buckets. Then the extent to which the bucket sizes are uniform can be expressed by $$u = \sum_{n=1}^{N}\left(s_n - \frac{1}{N}\right)^2 = \sum_{n=1}^{N} s_n^2 - \frac{1}{N}. \quad (1)$$

The smaller u is the more uniform the bucket sizes are. This expression is well compatible with the relation between the uniformity of the bucket sizes and the speed of ANN search. Since the time cost of the linear search in the buckets dominates the ANN search process, and under the assumption that the query features have similar distribution to the database features, the time cost is proportional to $\Sigma_{n=1}^{N} s_n^2$. As only one bit at a time is re-selected, the uniformity can also be expressed by the form $$u' = \frac{\sum_{n=1}^{N} s_n^2}{\sum_{m=1}^{N/2} s_m^2}, \quad (2)$$

where $\{s_m, m=1, 2, \ldots, N/2\}$ are constant, representing the normalized bucket sizes of the hash table which is obtained by indexing the database features with a key consisting of the unchanged bits. It can be verified that the value of u' belongs to [0.5 1]. The value of u'=0.5 indicates that with the newly selected bit in the hash key, the time cost of the linear search can be reduced by a half compared to with only the unchanged bits in the hash key. The value of u'=1, in turn, indicates that the newly selected bit does not bring any time saving. In the cost function, the term about the uniformity is set as 1/(1−u') to encourage a small u' and to avoid the situation that u'=1.

The Collision Rate

The collision rate of matched feature pairs is actually the probability that two matched features coincide with each other at all bits of the hash key. Let us refer to the probability that two matched features coincide at a certain bit as the stability $p_c$ of the bit, then according to the principle of greedy algorithms, the most stable one is preferred when selecting a bit for the hash key. Thus, the cost term about the collision rate is simply set as $1-p_c$. Since the features of a 3D point are actually the matches of each other, matched feature pairs can be easily obtained in the database and $p_c$ can be estimated by making statistics on these pairs.

According to an embodiment, the cost function C to be minimized reads as:

$$C=\lambda(1-p_c)+1/(1-u') \quad (3)$$

where λ is a preset weight.

The process of selecting one bit for a hash key is can be presented according to the following algorithm, where the hash key is denoted by $H_K=\{b_{s1}, b_{s2} \ldots, b_{sK}\}$, where $b_{sk}$ is the $s_k^{th}$ bit of the descriptor, $s_k \in [1\ D]$ and D is the length of the descriptor. 40 random numbers $\{r_1, r_2, \ldots, r_{40}\}$ are given only as an example, and the actual amount of random numbers may vary depending on the selected implementation.

---

Input: $H_K = \{b_{s1}, ..., b_{sk}, ..., b_{sK}\}$, with $b_{sk}$ being re-selected; F, all the database features.
begin
    Remove $b_{sk}$ from $H_K$ to get $H_K' = \{b_{s1}, ..., b_{sK}\}$;
    Index F using $H_K'$;
    Count the bucket sizes $\{s_m, m = 1, 2, ..., N/2\}$;
    Generate 40 random numbers $\{r_1, r_2,..., r_{40}\}$, $r_i \in [1\ D]$;
    Compute the stability of each $b_{ri}$;
    for i=1; i ≤ 40; i++; do
        Replace $b_{sk}$ in $H_K$ with $b_{ri}$ to get $H_K''$;
        Index F using $H_K''$;
        Compute the cost function C;
    end
    Select r* from $\{r_i\}$ so that C is minimized;
    Replace $b_{sk}$ with $b_r*$ in $H_K$;
end
Output: $H_K = \{b_{s1}, ...; b_r*, ...; b_{sK}\}$.

---

As can be seen from the algorithm, the time cost of the bit selection process is linear with the number of the database features, namely the number of the elements in F.

According to an embodiment, to make the algorithm scalable, a randomly composed subset of the elements in F may be used in the process of selecting one bit for a hash key. This may provide a constant time cost for the bit selection process while retaining the ability to discover 'good bits', i.e. the bits producing uniform bucket sizes and high collision rates.

According to an embodiment, to further reduce the training time, the bit selection process may be performed on a half of the hash keys when a new keyframe is inserted, and the two halves are selected in turn. This may slow down the discovering of good bits but it effectively reduces the system latency.

Various experiments have been carried out for evaluating the efficiency of the above indexing method on ANN search and the performance of the relocalization process. In an experiment, a long video V1 containing 12,821 frames around a building was taken, from which 293 keyframes were extracted during a SLAM process and 37,641 3D points along with 175,207 binary descriptors were obtained.

To demonstrate the advantage of the above indexing method, herein referred to as the learned LSH, the ANN search performance of the method is compared to that of the original LSH with the following setup:

Original LSH. Three configurations of the number of hash tables, i.e. 2, 6 and 10 respectively, are used in the experiment. In each configuration the length of the hash key ranges from 17 to 13, resulting in different search accuracies and timings.

Learned LSH. The configurations of the number of hash tables and the length of the hash key are identical to the original LSH. Each hash key in the learned LSH is the same as that in the Original LSH initially, and is changed during the SLAM process. The final hash keys used for the ANN search are the ones learned from all the 293 keyframes.

Figure 5A:
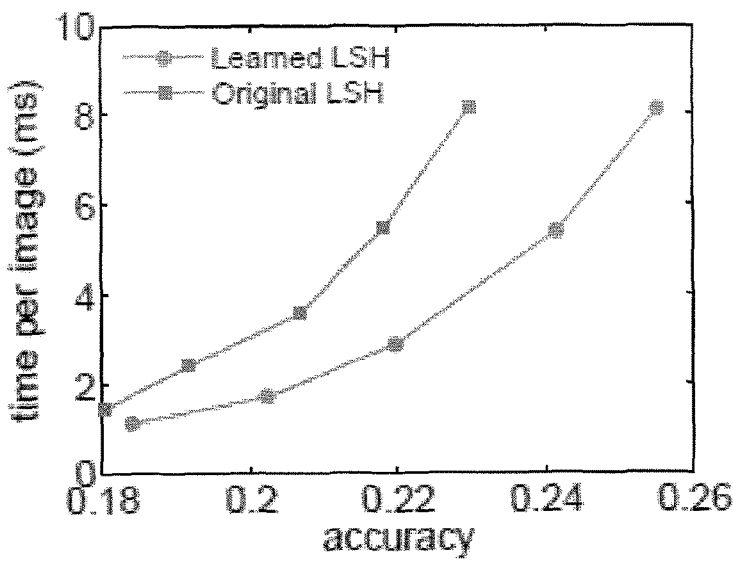
FIGS. 5a-5c show graphs for ANN search efficiency in an experiment carried out according to an embodiment of the invention.
Figure 5B:
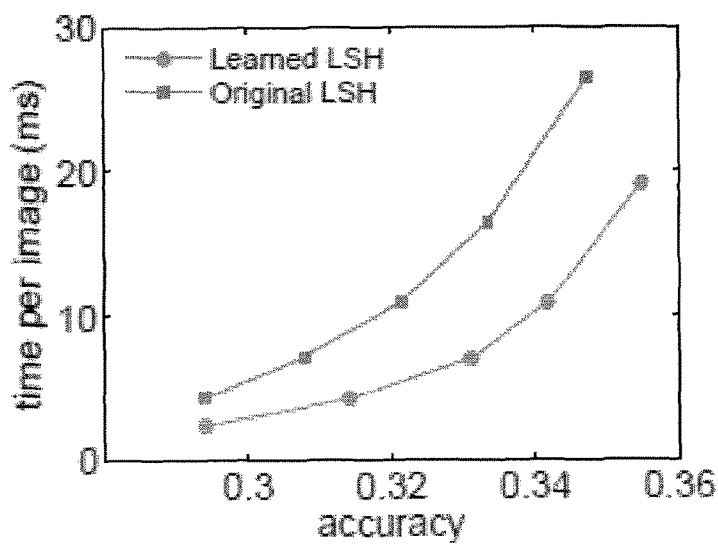
Figure 5C:
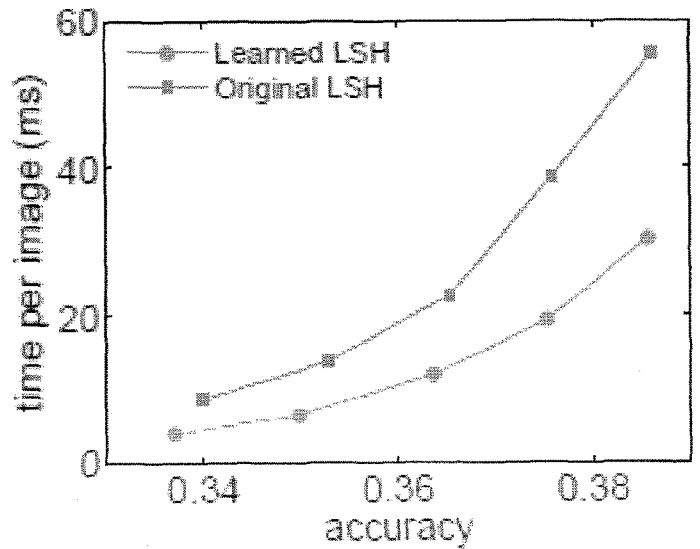

Herein, the search accuracy is defined as the ratio of successful ANN searches. The search time is the time cost of the whole ANN search process. FIGS. 5a, 5b and 5c show the ANN search results in terms of search accuracies and search timings obtained by using 2, 6, 10 hash tables, respectively. It can be seen that under these configurations, the ANN search performances of the learned LSH are consistently improved over the original LSH. Using the learned LSH takes less time than using the original LSH to reach the same search accuracy. For example, when 2 hash tables are used, the time cost can be reduced by about a half. These results indicate that the bit selection process is effective. Rather than being randomly generated, better hash keys can be learned by exploiting the features collected in the SLAM process.

Figure 6A:
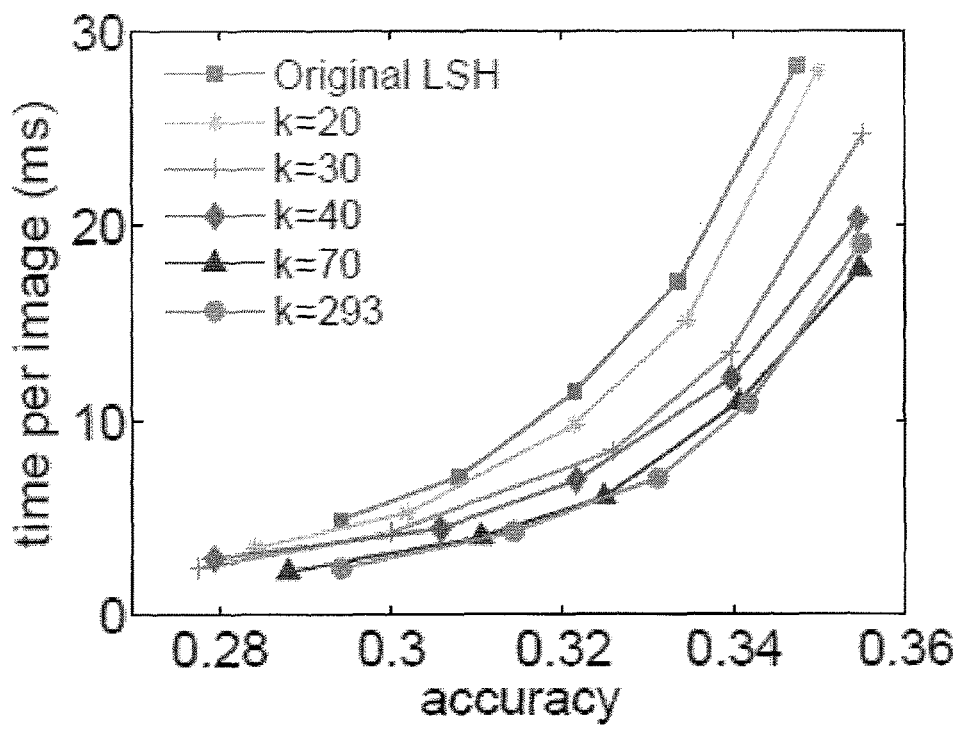
FIGS. 6a, 6b show graphs for ANN search results with different parameter settings in an experiment carried out according to an embodiment of the invention.

For demonstrating the evolution of the search efficiency of the learned LSH, another experiment was carried out as follows. The bit selection process was stopped after k keyframes were inserted and the resulted hash keys were used to perform ANN search for query features in the above dataset. The results are shown in FIG. 6a from which it can be seen that the search efficiency roughly increases as k increases. This is reasonable since as k increases, more bit selection processes are performed to increase the chance of finding good bits, and wider range of training data, i.e. larger number of database features, is also available. It can also be seen from FIG. 6a that as k increases to some extent, e.g. 70, the performance no longer improves. This result suggests that it is not necessary for endless learning and the learning may be stopped after enough bit selection processes are performed.

Figure 6B:
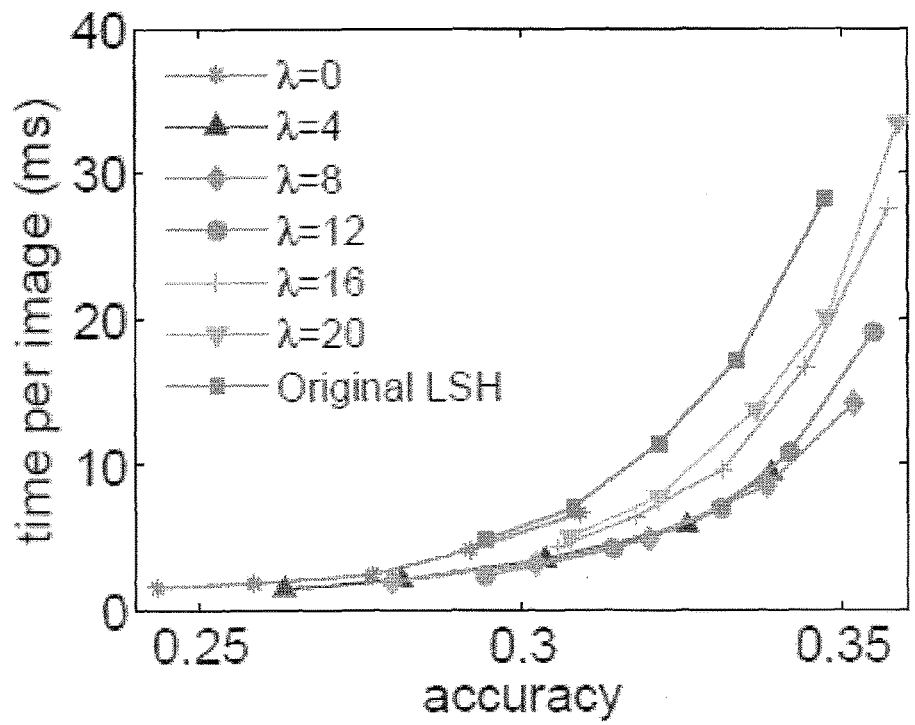

For determining an appropriate value for the parameter $\lambda$ in the cost function (Eq. 3), FIG. 6b shows its impact on the efficiency of the indexing method. It can be seen that either a too small value, e.g. 0, or a too big value e.g. 20, degrades the search efficiency. Therefore, a moderate value, such as 12, is preferred.

To evaluate the performance of the above relocalization process, an experiment was set up where two video segments were run with an aim to relocalize each frame of them. The first video segment contains 8000 frames from the video segment V1. The second video segment V2 was taken by moving the camera above an office desk and contains 1063 frames. The map involved in the second video segment was built by running SLAM on another video, from which 31 keyframes were extracted and 4173 3D points along with 20,846 database features were obtained.

In the experiment, the learned LSH is used for ANN search in the process of establishing 3D-2D correspondences. For comparison, the original LSH is also used. In V1, both the original LSH and the learned LSH has 10 hash tables with key length of 14, and the hash keys in the learned LSH are learned from all the keyframes. In V2, the original LSH has 10 hash tables with key length of 14 and the learned LSH has 10 hash tables with key length of 13. Again the hash keys in the learned LSH are learned from all the keyframes.

The table in FIG. 7 summarizes the relocalization results which are averaged over 5 repetitions to alleviate the effect of the randomness in RANSAC. It is shown that in V1, 7859 frames out of 8000 frames, i.e. 98.2% are successfully relocalized at a speed of the frame rate, which demonstrates the good scalability of the relocalization module for large maps. Besides, due to the higher efficiency of the learned LSH compared to the original LSH, the time cost of ANN search can be reduced by 42%, and a slightly more, i.e. 0.3%, of the frames can be successfully relocalized. In V2, the view point differences between the query frames and the keyframes are larger than that in V1, thus a lower registration rate, i.e. 89.6%, is obtained. Since the map in V2 is relatively small, the time cost saving by using the learned LSH is not as prominent as that in V1. However the improvement of the registration rate, 2.4%, is now more noticeable. This improvement should also be ascribed to the higher efficiency of the learned LSH: by taking the same time, using the learned LSH produces higher search accuracy than using the original LSH.

A skilled person appreciates that any of the embodiments described above may be implemented as a combination with one or more of the other embodiments, unless there is explicitly or implicitly stated that certain embodiments are only alternatives to each other.

As confirmed by the experiments, the various embodiments may provide advantages over state of the art. The hash keys are constructed with the aim of obtaining uniform hash buckets and high collision rates, which makes the method more efficient on approximate nearest neighbor search than LSH. By distributing the online learning into the simultaneous localization and mapping (SLAM) process, the method can be successfully apply to SLAM relocalization. Moreover, experiments show that camera poses can be successfully recovered in real time even if there are tens of thousands of landmarks in the map.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

What is claimed is:

1. A method implemented by a data processing system for estimating a camera pose of a two-dimensional (2D) image, the method comprising:

obtaining a three-dimensional (3D) point cloud about an object;

obtaining binary feature descriptors for feature points in the 2D image about the object;

assigning a plurality of index values for each feature point as multiple bits of the corresponding binary feature descriptor;

storing the binary feature descriptor in a table entry of a plurality of hash key tables of a database image;

obtaining query binary feature descriptors for feature points in a query image;

matching the query binary feature descriptors to the binary feature descriptors of the database image;

selecting one bit of the hash key of the matched database image; and re-indexing the feature points in the table entries of the hash key table of the database image.

2. The method according to claim 1, wherein selecting one bit of the hash key comprises selecting said one bit of the hash key of the matched database image such that a cost function defining uniformity of sizes of the table entries and a collision rate of matched feature pairs is minimized.

3. The method according to claim 2, wherein said cost function is $C=\lambda(1-p_c)+1/(1-u')$, where $\lambda$ is a preset weight, $p_c$ is a probability that two matched features coincide at a certain bit and u' is a factor of time reduction in a linear search for matching the query binary feature descriptors to the binary feature descriptors.

4. The method according to claim 1, wherein said multiple bits of the index values for each feature point are selected randomly from the corresponding binary feature descriptor.

5. The method according to claim 1, wherein the query binary feature descriptors are matched to the binary feature descriptors of the database image using an approximated nearest neighbor (ANN) search.

6. The method according to claim 1, wherein selecting one bit of the hash key comprises selecting said one bit for the hash key in a randomly composed subset of the feature points.

7. The method according to claim 1 further comprising:
reselecting said one bit among a first half of the hash keys when a new query image is obtained; and
reselecting said one bit among a second half of the hash keys when a next query image is obtained.

8. An apparatus of a data processing system configured to estimate a camera pose of a two-dimensional (2D) image, the apparatus comprising at least one processor, memory including computer program code, the memory and the computer program code configured to, with the at least one processor, cause the apparatus to at least:

obtain a three-dimensional (3D) point cloud about an object;

obtain binary feature descriptors for feature points in the 2D image about the object;

assign a plurality of index values for each feature point as multiple bits of the corresponding binary feature descriptor;

store the binary feature descriptor in a table entry of a plurality of hash key tables of a database image;

obtain query binary feature descriptors for feature points in a query image;

match the query binary feature descriptors to the binary feature descriptors of the database image;

select one bit of the hash key of the matched database image; and re-index the feature points in the table entries of the hash key table of the database image.

9. The apparatus according to claim 8, wherein the apparatus being configured to select the one bit of the hash key comprises the apparatus being configured to select said one bit of the hash key of the matched database image such that a cost function defining uniformity of sizes of the table entries and a collision rate of matched feature pairs is minimized.

10. The apparatus according to claim 9, wherein said cost function is $C=\lambda(1-p_c)+1/(1-u')$, where $\lambda$ is a preset weight, $p_c$ is a probability that two matched features coincide at a certain bit and u' is a factor of time reduction in a linear search for matching the query binary feature descriptors to the binary feature descriptors.

11. The apparatus according to claim 8, wherein the apparatus is further configured to at least:
select said multiple bits of the index values for each feature point randomly from the corresponding binary feature descriptor.

12. The apparatus according to claim 8, wherein the apparatus is further configured to at least:
match the query binary feature descriptors to the binary feature descriptors of the database image using an approximated nearest neighbor (ANN) search.

13. The apparatus according to claim 8, wherein the apparatus being configured to select the one bit of the hash key comprises the apparatus being configured to select said one bit for the hash key in a randomly composed subset of the feature points.

14. The apparatus according to claim 8, wherein the apparatus is further configured to at least:
reselect said one bit among a first half of the hash keys when a new query image is obtained; and
reselect said one bit among a second half of the hash keys when a next query image is obtained.

15. A computer readable storage medium of a data processing system configured to estimate a camera pose of a two-dimensional (2D) image, the computer readable storage medium stored with code thereon for use by an apparatus, which when executed by a processor, causes the apparatus to perform:

obtain a three-dimensional (3D) point cloud about an object;

obtain binary feature descriptors for feature points in the 2D image about the object;

assign a plurality of index values for each feature point as multiple bits of the corresponding binary feature descriptor;

store the binary feature descriptor in a table entry of a plurality of hash key tables of a database image;

obtain query binary feature descriptors for feature points in a query image;

match the query binary feature descriptors to the binary feature descriptors of the database image;

select one bit of the hash key of the matched database image; and re-index the feature points in the table entries of the hash key table of the database image.

16. The computer readable storage medium according to claim 15, wherein the apparatus being caused to select the one bit of the hash key comprises the apparatus being configured to select said one bit of the hash key of the matched database image such that a cost function defining uniformity of sizes of the table entries and a collision rate of matched feature pairs is minimized.

17. The computer readable storage medium according to claim 15, wherein said multiple bits of the index values for each feature point are selected randomly from the corresponding binary feature descriptor.

18. The computer readable storage medium according to claim 15, wherein the query binary feature descriptors are matched to the binary feature descriptors of the database image using an approximated nearest neighbor (ANN) search.

19. The computer readable storage medium according to claim 15, wherein the apparatus being caused to select the one bit of the hash key comprises the apparatus being configured to select said one bit for the hash key in a randomly composed subset of the feature points.

20. The computer readable storage medium according to claim 15, wherein the apparatus is further caused at least to:
- reselect said one bit among a first half of the hash keys when a new query image is obtained; and
- reselect said one bit among a second half of the hash keys when a next query image is obtained.

* * * * *